(12) United States Patent
Peng et al.

(10) Patent No.: US 8,493,701 B2
(45) Date of Patent: Jul. 23, 2013

(54) OVERVOLTAGE PROTECTION CIRCUIT

(75) Inventors: Xiao-Zhan Peng, Shenzhen (CN);
Xue-Bing Deng, Shenzhen (CN);
Xin-Ping Li, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 25 days.

(21) Appl. No.: 13/191,450

(22) Filed: Jul. 27, 2011

(65) Prior Publication Data

US 2012/0327544 A1 Dec. 27, 2012

(30) Foreign Application Priority Data

Jun. 24, 2011 (CN) .......................... 2011 1 0173810

(51) Int. Cl.
*H02H 3/20* (2006.01)

(52) U.S. Cl.
USPC ....................................... 361/91.5

(58) Field of Classification Search
USPC ....................................... 361/91.5
See application file for complete search history.

(56) References Cited

U.S. PATENT DOCUMENTS

| 5,302,902 | A  | * | 4/1994 | Groehl ............................ 324/434 |
| 5,510,944 | A  | * | 4/1996 | Mozar et al. ..................... 361/18 |
| 6,816,348 | B2 | * | 11/2004 | Chen et al. ....................... 361/56 |
| 7,410,231 | B2 | * | 8/2008 | Zhao et al. ......................... 347/9 |

* cited by examiner

*Primary Examiner* — Jared Fureman
*Assistant Examiner* — Kevin J Comber
(74) *Attorney, Agent, or Firm* — Altis Law Group, Inc.

(57) ABSTRACT

An overvoltage protection circuit includes a connection jack, a path connection module, a voltage response module, and a control module. The connection jack is connected to a power supply. The path connection module is connected between the connection jack and a load. The voltage response module is to output a first signal in response to an overvoltage, and output a second signal in response to a constant voltage. The control module is to output a corresponding potential according to the first signal to turn off the path connection module, and output a corresponding potential according to the second signal to turn on the path connection module. When the path connection module is turned off, the connection between the connection jack and the load is disabled, when the path connection module is turned on, the connection between the connection jack and the load is enabled.

12 Claims, 2 Drawing Sheets

OVERVOLTAGE PROTECTION CIRCUIT

BACKGROUND

1. Technical Field

The present disclosure relates to circuits and, particularly, to an overvoltage protection circuit.

2. Description of Related Art

When powering on an electronic device, the voltage of a circuit of the electronic device may be raised above its load, that is, overvoltage may occur. The overvoltage may damage some electronic elements of the circuit. Therefore, an overvoltage protection circuit is needed to solve the above problems.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Embodiments of the present disclosure are now described in detail, with reference to the accompanying drawings.

Figure 1:
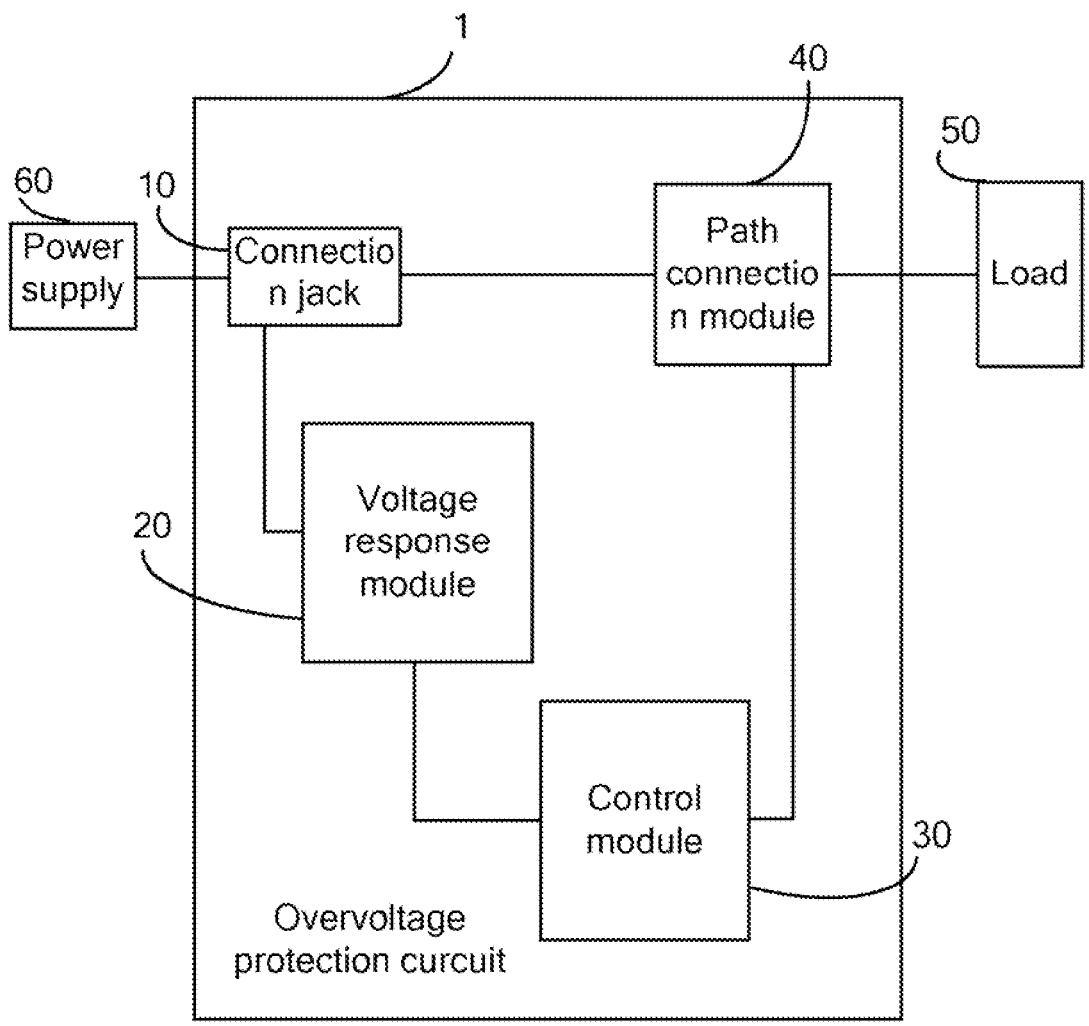
FIG. 1 is a block diagram of an overvoltage protection circuit in accordance with an exemplary embodiment.

Referring to FIG. 1, a block diagram of an overvoltage protection circuit 1 in accordance with an exemplary embodiment is shown. The circuit 1 includes a connection jack 10, a voltage response module 20, a control module 30, a path connection module 40, and a load 50. The connection jack 10 is connected to a power supply 60 to receive power from the power supply 60. The path connection module 40 is connected between the connection jack 10 and the load 50, and is configured for controlling a connection between the connection jack 10 and the load 50. When the path connection module 40 is on, the connection between the connection jack 10 and the load 50 is enabled; when the path connection module 40 is off, the connection between the connection jack 10 and the load 50 is disabled.

The voltage response module 20 outputs a first signal when the overvoltage occurs. The control module 30 turns off the path connection module 40 in response to the first signal, thus the connection between the connection jack 10 and the load 50 is disabled, and the connection between the power supply 60 and the load 50 is also disabled. That is, when overvoltage occurs, the load 50 cannot receive power from the power supply 60, and the load 50 is protected. The voltage response module 20 further outputs a second signal when the overvoltage condition abates. The control module 30 turns on the path connection module 40 in response to the second signal, thus the connection between the connection jack 10 and the load 50 is turned on, and the connection between the power supply 60 and the load 50 is also turned on. That is, when the voltage from the power supply is steady, the load 50 can receive power from the power supply.

Figure 2:
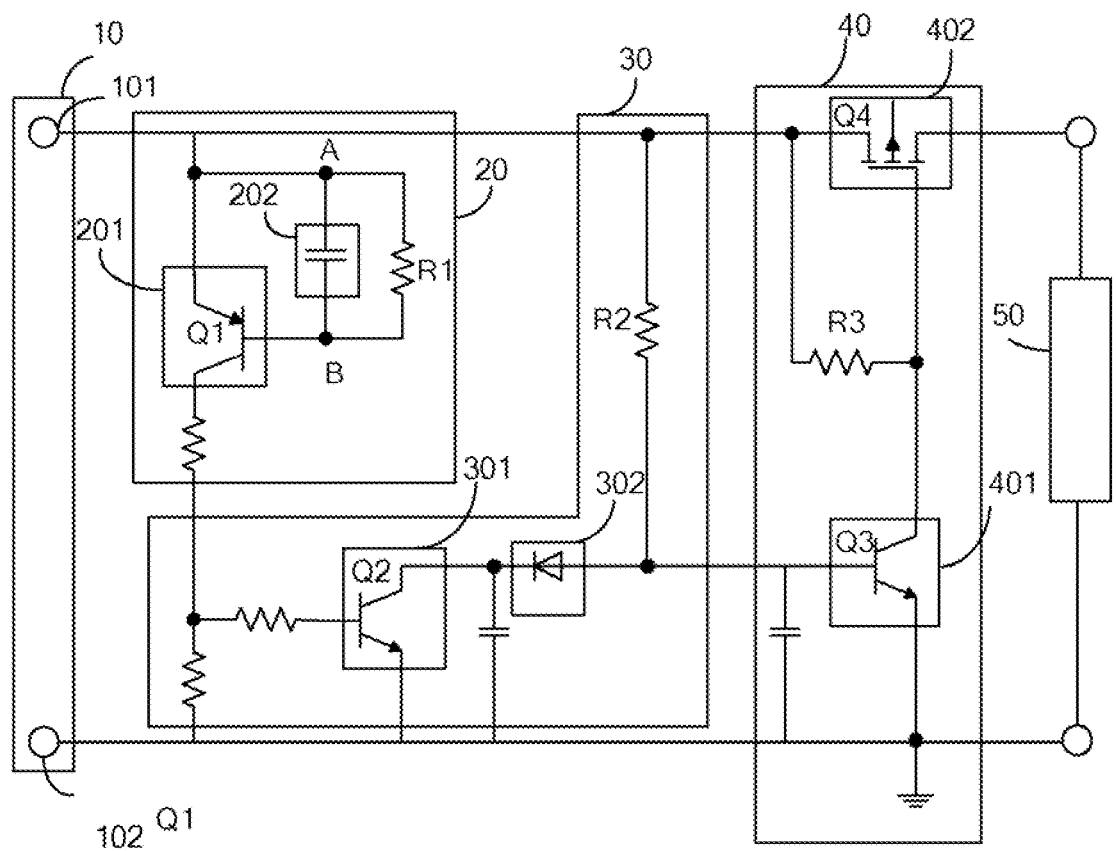
FIG. 2 is a circuit diagram of FIG. 1.

Referring to FIG. 2, a circuit diagram of the overvoltage protection circuit 1 is shown. The connection jack 10 includes an anode input port 101 and a cathode input port 102 respectively connected to an anode and a cathode of the power supply 60. The voltage response module 20 includes a low voltage activated switch 201, a capacitor 202, and a resistor R1. In the embodiment, a pnp bipolar junction transistor (BJT) Q1 is taken as an example to illustrate the low voltage activated switch 201. An emitter of the pnp BJT Q1 is connected to the anode input port 101, and a collector of the pnp BJT Q1 is connected to the control module 30. The capacitor 202 and the resistor R1 are connected in parallel between a base of the pnp BJT Q1 and the emitter of the pnp BJT Q1. A node A is formed among the emitter of the pnp BJT Q1, the capacitor 202, and the resistor R1, and a node B is formed among the collector of the pnp BJT Q1, the capacitor 202, and the resistor R1.

The control module 30 includes a high voltage activated switch 301, a diode 302, and a resistor R2. In the embodiment, an npn BJT Q2 is taken as an example to illustrate the high voltage activated switch 301. A base of the npn BJT Q2 is connected to the collector of the pnp BJT Q1, an emitter of the npn BJT Q2 is grounded, and a collector of the npn BJT Q2 is connected to the cathode of the diode 302. The anode of the diode 302 is connected to the path connection module 40, and connected to the anode input port 101 through the resistor R2.

The path connection module 40 includes a first high voltage activated switch 401, a second high voltage activated switch 402, and a resistor R3. In the embodiment, an npn BJT Q3 is taken as an example to illustrate the first high voltage activated switch 401, and an n-channel metal-oxide-semiconductor field-effect transistor (NMOSFET) Q4 is taken as an example to illustrate the second high voltage activated switch 402. A base of the npn BJT Q3 is connected to the anode of the diode 302, and connected to the anode input port 101 through the resistor R2, an emitter of the npn BJT Q3 is grounded, and a collector of the npn BJT Q3 is connected to a gate of the NMOSFET Q4. A source of the NMOSFET Q4 is connected to the anode input port 101, the gate of the NMOSFET Q4 is connected to the anode input port 101 through the resistor R3, and a drain of the NMOSFET Q4 is connected to the load 50.

When overvoltage occurs, the power supply 60 starts to charge the capacitor 202, causing the voltage of the terminal of the capacitor 202 connected to the emitter of the pnp BJT Q1 to be higher than that of the terminal of the capacitor 202 connected to the base of the pnp BJT Q1, namely, the voltage of the node A is higher than that of the node B. Thus the base voltage of the pnp BJT Q1 is lower than the emitter voltage of the pnp BJT Q1, and the pnp BJT Q1 is correspondingly turned on. The power supply 60 outputs a high voltage signal such as +5V to the base of the npn BJT Q2 through the pnp BJT Q1, namely, the voltage response module 20 outputs the first signal to the control module 30 to turn on the npn BJT Q2. The cathode of the diode 302 obtains a low voltage signal such as 0V, and the anode of the diode 302 obtains a high voltage from the power supply 60, resulting in the diode 302 turning on. The base of the npn BJT Q3 is grounded through the turned on diode 302, namely, the control module 30 outputs a low voltage to the path connection module 40, causing the npn BJT Q3 to be turned off. The gate of the NMOSFET Q4 obtains a high voltage from the power supply 10, thus the NMOSFET Q4 is turned off. Thus the voltage of the load 50 is zero, which prevents the load 50 from being damaged by overvoltage.

When the overvoltage condition abates and when the voltage of the node A of the capacitor 202 is charged to a predetermined threshold value, the power supply 60 starts to charge the node B of the capacitor 202 through the resistor R1, and the voltage of the node B of the capacitor 202 rises gradually until the voltage difference between the node B and node A is less than the cut-in voltage of the pnp BJT Q1, causing the pnp BJT Q1 to be turned off. The base of the npn BJT Q2 is connected to ground to obtain a low voltage, namely, the voltage response module 20 outputs a second signal to the control module 30, causing the npn BJT Q2 to be turned off. The anode of the diode 302 is connected to the anode input port 101 through the resistor R2 to obtain a high voltage from the power supply 10, thus the control module 30 outputs a high voltage to the path connection module 40, resulting in the npn BJT Q3 turning on. The gate of the NMOSFET Q4 is grounded through the conductive npn BJT Q3 to obtain a low voltage, resulting in the NMOSFET Q4 turning on. Thus, the power supply 60 is connected to the load 50, and supplies power to the load 50.

With such configuration, when overvoltage occurs, the control module 30 turns off the path connection module 40 to cut off the connection between the connection jack 10 and the load 50. Thus the load 50 cannot receive power from the power supply 60 and the load 50 is protected.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An overvoltage protection circuit, comprising:
a connection jack for connecting to a power supply to receive power from the power supply;
a path connection module connected between the connection jack and a load;
a voltage response module to output a first signal when overvoltage occurs, and output a second signal when overvoltage disappears; and
a control module to output a corresponding potential according to the first signal to turn off the path connection module, and output a corresponding potential according to the second signal to turn on the path connection module;
wherein when the path connection module is turned off, the connection between the connection jack and the load is disabled, and when the path connection module is turned on, the connection between the connection jack and the load is enabled;
the control module comprises a first npn BJT, a diode, and a first resistor, the base of the first npn BJT is connected to the voltage response module, the emitter of the first npn BJT is grounded, and the collector is connected to the cathode of the diode, the anode of the diode is connected to the path connection module and connected to the anode of the power supply through the first resistor; and
the path connection module comprises a second npn BJT, an n-channel metal-oxide-semiconductor filed-effect transistor (NMOSFET), and a second resistor, the base of the second npn BJT is connected to the anode of the diode and the anode input port through the first resistor, the emitter of the second npn BJT is grounded, and the collector of the second npn BJT is connected to the gate of the NMOSFET, the gate of the NMOSFET is connected to the anode of the power supply through the second resistor, the source of the NMOSFET is connected to the anode of the power supply, the drain of the NMOSFET is connected to the load.

2. The overvoltage protection circuit as described in claim 1, wherein the voltage response module comprises a pnp bipolar junction transistor (BJT), a capacitor and a resistor, an emitter of the pnp BJT is connected to the capacitor and the anode of the power supply, a collector of the pnp BJT is connected to the control module, and the capacitor and the resistor are connected in parallel between a base of the pnp BJT and the emitter of the pnp BJT.

3. The overvoltage protection circuit as described in claim 2, wherein a terminal of the capacitor connected to the emitter of the pnp BJT is charged by the power supply when overvoltage occurs, the emitter voltage of the pnp BJT is higher than the base voltage of the pnp BJT, resulting the pnp BJT to be turned on, the voltage response module outputs a first signal.

4. The overvoltage protection circuit as described in claim 2, wherein a terminal of the capacitor connected to the base of the pnp BJT is charged by the power supply when the voltage of the terminal of the capacitor is charged to the voltage of the power supply until the voltage difference between the emitter of the pnp BJT and the base of the pnp BJT is less than the cut-in voltage of the pnp BJT, causing the pnp BJT to be turned off, the voltage response module outputs a second signal.

5. The overvoltage protection circuit as described in claim 1, wherein when the voltage response module outputs a first signal, the base voltage of the first npn BJT is higher than the emitter voltage of the first npn BJT, resulting the first npn BJT to be turned on, the cathode of the diode is grounded through the first npn BJT to obtain a low voltage, the anode of the diode is connected to the anode of the power supply through the first resistor, resulting in the diode turning on, the control module outputs a low voltage to the path connection module.

6. The overvoltage protection circuit as described in claim 1, wherein when the voltage response module outputs a second signal, the base voltage of the first npn BJT is lower than the emitter voltage of the first npn BJT, causing the first npn BJT to be turned off, the anode of the diode is connected to the anode of the power supply through the first resistor, the control module outputs a high voltage to the path connection module.

7. The overvoltage protection circuit as described in claim 1, wherein when the control module outputs a low voltage to the path connection module, the base voltage of the second npn BJT is lower than the emitter voltage of the second npn BJT, causing the second npn BJT to be turned off, the gate of the NMOSFET is connected to the anode of the power supply to obtain a high voltage through the second resistor, causing the NMOSFET to be turned off.

8. The overvoltage protection circuit as described in claim 1, wherein when the control module outputs a high voltage to the path connection module, the base voltage of the second npn BJT is higher than the emitter voltage of the second npn BJT, resulting in the second npn BJT turning on, the gate of the NMOSFET is grounded to obtain a low voltage through the conductive second npn BJT, resulting in the NMOSFET turning on.

9. The overvoltage protection circuit as described in claim 1, wherein the voltage response module comprises a low voltage activated switch, a capacitor and a resistor; the low voltage activated switch comprises a first terminal connected to the capacitor and the anode of the power supply, a second terminal connected to the control module, and a third terminal, and the capacitor and the resistor are connected in parallel between the first and the third terminals.

10. The overvoltage protection circuit as described in claim 9, wherein the low voltage activated switch is a pnp bipolar junction transistor (BJT), the first, second and third terminals are an emitter, a collector, and a base of the pnp BJT, respectively.

11. The overvoltage protection circuit as described in claim 1, wherein the control module comprises a high voltage activated switch, a diode, and a resistor, the high voltage activated switch comprises a first terminal connected to the voltage response module, a second terminal connected to the grounded, and a third terminal connected to the cathode of the diode, the anode of the diode is connected to the path connection module and connected to the anode of the power supply through the resistor.

12. The overvoltage protection circuit as described in claim 11, wherein the high voltage activated switch is a npn bipolar junction transistor (BJT), the first, second and third terminals are a base, an emitter, and a collector of the pnp BJT, respectively.

* * * * *